(12) United States Patent
Holten et al.

(10) Patent No.: US 8,721,101 B2
(45) Date of Patent: May 13, 2014

(54) LIGHT EMITTING DEVICE COMPRISING A LIGHT GUIDE PLATE WITH REFLECTIVE SHIELDING WITH GLARE REDUCTION

(75) Inventors: Petrus Adrianus Josephus Holten, Aalten (NL); Giorgia Tordini, Lyon (FR); Denis Fournier, Lyon (FR)

(73) Assignee: Koninklijke Philips N.V., Eindhoven (NL)

( * ) Notice: Subject to any disclaimer, the term of this patent is extended or adjusted under 35 U.S.C. 154(b) by 48 days.

(21) Appl. No.: 13/496,937

(22) PCT Filed: Sep. 9, 2010

(86) PCT No.: PCT/IB2010/054057
§ 371 (c)(1),
(2), (4) Date: Mar. 19, 2012

(87) PCT Pub. No.: WO2011/033424
PCT Pub. Date: Mar. 24, 2011

(65) Prior Publication Data
US 2012/0176813 A1  Jul. 12, 2012

(30) Foreign Application Priority Data
Sep. 21, 2009 (EP) ..................... 09170790

(51) Int. Cl.
*G09F 13/04* (2006.01)
(52) U.S. Cl.
USPC ................ 362/97.3; 362/331; 362/339
(58) Field of Classification Search
USPC ........... 362/97.3, 331, 339, 612, 919, 632, 362/97.1; 349/63
See application file for complete search history.

(56) References Cited

U.S. PATENT DOCUMENTS

| | | | |
|---|---|---|---|
| 5,649,754 A | 7/1997 | Matsumoto | |
| 6,301,002 B1 * | 10/2001 | Manico et al. | 355/75 |
| 6,367,941 B2 | 4/2002 | Lea et al. | |
| 7,063,430 B2 * | 6/2006 | Greiner | 362/30 |
| 7,341,358 B2 * | 3/2008 | Hsieh et al. | 362/97.1 |
| 7,585,083 B2 * | 9/2009 | Kim et al. | 362/97.3 |
| 7,585,094 B2 * | 9/2009 | Chang | 362/332 |
| 7,654,687 B2 * | 2/2010 | Tsai et al. | 362/237 |

(Continued)

FOREIGN PATENT DOCUMENTS

| | | |
|---|---|---|
| EP | 1589590 A2 | 10/2005 |
| EP | 1640756 A1 | 3/2006 |

(Continued)

*Primary Examiner* — Peggy A. Neils
(74) *Attorney, Agent, or Firm* — Mark L. Beloborodov

(57) ABSTRACT

The present invention relates to light emitting devices and more specifically to light emitting devices comprising light guides making use of total internal reflection (TIR). The light emitting device (100, 600) comprises a substrate (3), a plurality of light sources (2) mounted on the substrate (3) and a light guide plate (4). Reflective shielding (5) is arranged to shield the light guide plate (4) at positions were the flux of the direct light of the light sources (2) towards the light guide plate (4) have their maximum density in a powered state of the light sources (2). The reflective shielding (5) enhances the mixing of light and avoids glare problems. In-coupled is transmitted within the light guide plate (4) by total internal reflection so that light from different light sources (2) is mixed within the light guide plate (4). Further, at least a part of the lower surface is provided with an optical structure (6) for out-coupling of light.

14 Claims, 2 Drawing Sheets

(56) References Cited

U.S. PATENT DOCUMENTS

| | | |
|---|---|---|
| 7,791,683 B2 * | 9/2010 | Larson et al. .................. 349/62 |
| 7,887,208 B2 * | 2/2011 | Tsukada ....................... 362/97.1 |
| 8,109,644 B2 * | 2/2012 | Bierhuizen .................. 362/97.3 |
| 8,467,013 B2 * | 6/2013 | Gourlay .......................... 349/64 |
| 2002/0097578 A1 | 7/2002 | Greiner |
| 2003/0231265 A1 | 12/2003 | Yamazaki et al. |
| 2005/0265029 A1 | 12/2005 | Epstein et al. |
| 2006/0164840 A1 | 7/2006 | Song et al. |
| 2006/0203146 A1 | 9/2006 | Bang |
| 2008/0055931 A1 * | 3/2008 | Verstraete et al. ............ 362/612 |
| 2008/0089093 A1 | 4/2008 | Miller et al. |
| 2008/0285287 A1 | 11/2008 | Chang |
| 2009/0003002 A1 | 1/2009 | Sato |
| 2009/0128735 A1 | 5/2009 | Larson et al. |

FOREIGN PATENT DOCUMENTS

| | | | |
|---|---|---|---|
| WO | 2008047284 A2 | 4/2008 | |
| WO | 2008065576 A1 | 6/2008 | |
| WO | WO 2009/072575 | * 6/2009 | .................. 362/97.3 |

* cited by examiner

LIGHT EMITTING DEVICE COMPRISING A LIGHT GUIDE PLATE WITH REFLECTIVE SHIELDING WITH GLARE REDUCTION

FIELD OF THE INVENTION

The present invention relates to light emitting devices and more specifically to light emitting devices comprising light guides making use of total internal reflection (TIR).

BACKGROUND OF THE INVENTION

Light emitting devices of the kind referred to here generally consist of one or more light emitting diodes (LEDs) and a light guiding plate attached in connection to the LEDs. The light guiding layer of these known light emitting devices further comprises a number of optical structures for out-coupling of light on a light emitting surface thereof. A problem with this type of light emitting devices is that the use of LEDs causes glare problems in some situations, for example when being used for lighting purposes in offices and other working places. For example, European Union regulations limit the luminance exposed to an observer to $\sim 10^3$ cd/m$^2$ in most sensible directions (from 90° to 65° with vertical) and to $\sim 10^4$ cd/m$^2$ in other directions. One attempt to solve this problem is made in US2005/0265029, in which a light emitting device according to the above is disclosed. In this prior art device each light extracting structure is centered over a respective LED and is adapted to extract less light at a position close to the LED itself and to extract more light further away from the LED. By doing this, glare problems are reduced. A drawback with that known light emitting device is that it offers a very limited degree of flexibility since it is difficult to adapt an existing device to different requirements. If, due to changed requirements, a light emitting device with more light flux is needed, the device according to that prior art cannot simply be upgraded with more powerful LEDs. This since the light guide plate is adapted to provide a certain degree of glare protection by reduction of the extraction of light by the light extracting structures. Thus, if more powerful LEDs were to be used in that known system, glare problems would arise. Also, if, one or more LEDs were to be removed or if one or more LEDs would fail, the corresponding array element/elements would turn substantially darker than adjacent ones since each array element is exposed directly to a corresponding LED.

SUMMARY OF THE INVENTION

It is an object of the present invention to reduce or even overcome this problem, and to provide a light emitting device which can be equipped with different types and different numbers of LEDs, depending on the intended use.

According to a first aspect of the invention, this and other objects are achieved with a light emitting device according to the present invention as defined in claim 1. Consequently, in accordance with an aspect of the invention, there is provided a light emitting device comprising a plurality of light sources and a light guide plate. The light guide plate has a light exit surface and an opposed light entrance surface facing the plurality of light sources. The light entrance surface is arranged for in-coupling of light emitted by the light sources into the light guide plate. At least part of the in-coupled light is transmitted within the light guide plate by total internal reflection so that light from different light sources is mixed within the light guide plate. At least part of the light exit surface is provided with an optical structure for out-coupling of light.

The light emitting device further comprises a reflective shielding provided at positions where the flux of the direct light of the light sources towards the light guide plate have their maximum density in a powered state of the light sources. In this way, each optical structure for out-coupling of light is not exposed to high density direct light from a light source. Instead, a mixing of light emitted by the plurality of light sources takes place before it is in-coupled into the light guide plate and can exit through the optical structures. This provides for very efficient glare protection.

In accordance with an embodiment of the light emitting device, the reflective shielding is provided at the light entrance surface of the light guide plate at positions where the flux of the direct light of the light sources towards the light guide plate have their maximum density in a powered state of the light sources. A reflective shielding can easily be provided at the light entrance surface of the light guide plate during manufacture thereof.

In accordance with an embodiment of the light emitting device, the light sources are mounted on a substrate and wherein a surface of the substrate facing the light guide plate is provided with reflective shielding. Light which has been reflected towards the light source will be reflected back towards the light guide plate, thereby enhancing the optical efficiency and mixing of the light emitted by different light sources. The mixing averages differences in color temperature and flux of the light sources, thereby increasing binning tolerances for the light emitting device.

In accordance with an embodiment of the light emitting device, a plurality of optical structures are provided as separate exit windows over the light exit surface of the light guide plate and at least a part of the non-structured area of the light exit surface of the light guide plate is flat. By alternating optical structures for out-coupling of light and flat parts over the surface of the light guide plate, a large variety of different exit window patterns can be obtained.

In accordance with an embodiment of the light emitting device, a roughness is introduced into a part of the flat light exit surface of the light guide plate in order to provide secondary out-coupling of light.

In accordance with an embodiment of the light emitting device, the light guide plate is connected to the substrate by way of side walls arranged along an outer edge of the light guide plate, and wherein inner surfaces of the side walls are provided with reflective shielding. The reflective shielding enhances the optical efficiency and mixing of the light within the light emitting device.

In accordance with an embodiment of the light emitting device, the side walls are arranged such that lateral surfaces of the light guide plate are exposed. By leaving lateral surfaces of the light guide plate exposed, it is possible to couple a plurality of light emitting devices to each other in such that light will be transmitted between the light guide plates of the different light emitting devices.

In accordance with an embodiment of the light emitting device, the side walls are arranged such that they cover lateral surfaces of the light guide plate.

In accordance with an embodiment of the light emitting device, the light sources comprise light emitting diodes.

In accordance with an embodiment of the light emitting device, the optical structure comprises conical lenses.

In accordance with an embodiment of the light emitting device, the optical structure comprises elements having a pyramidal shape.

In accordance with an embodiment of the light emitting device, the optical structure comprises diffusive elements.

In accordance with an embodiment of the light emitting device, the optical structure comprises a refractive collimating structure.

In accordance with an embodiment of the light emitting device, reflective shielding is provided at the light guide plate such that at least 10% and not more than 90% of the area of the light exit surface of the light guide plate is shielded.

According to a further aspect of the present invention there is provided a luminaire comprising such a light emitting device.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
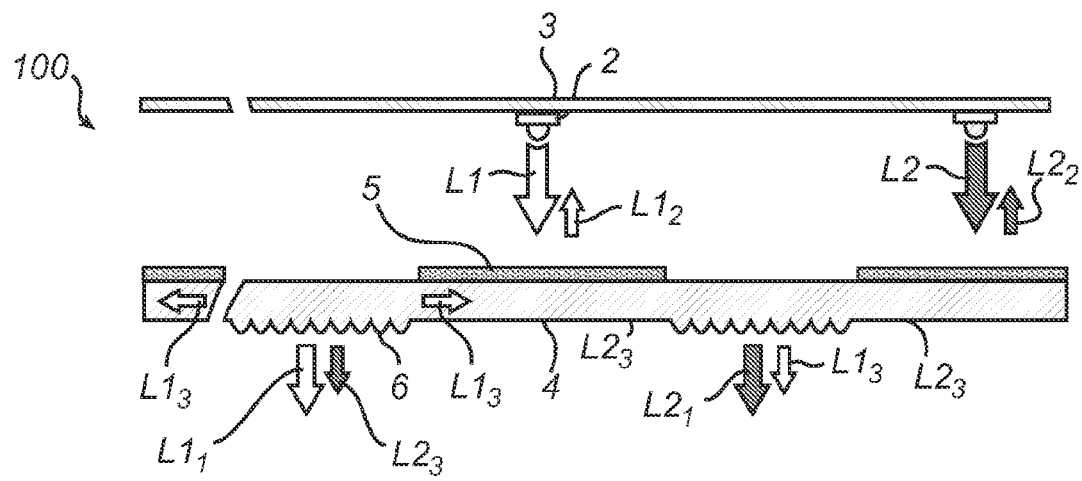
FIG. 1 shows a diagrammatical cross-sectional side view of an embodiment of a lighting device according to the present inventive concept.

FIG. 1 shows a light emitting device 100 in accordance with an embodiment of the present invention. The light emitting device 100 comprises a substrate 3 made from any suitable material such as aluminum, or another metal, or a polymer substrate. A plurality of light sources 2, in this case LEDs, are attached to the lower side of the substrate 3 and are adapted to generate light downwards in the direction of light exit windows of the light emitting device 100. This provides for a good thermal efficiency since the heat generated by the LEDs can exit the light emitting device 100 upwards.

Below and substantially parallel to the substrate 3, a light guide plate 4 is arranged. This light guide plate 4 is made from translucent material such as e.g. acrylic or polycarbonate. The light exit surface of the light guide plate 4 is provided with one or more optical structures 6 for out-coupling of light. These optical structures 6 are formed as individual light exit windows over the light exit surface of the light guide plate. The optical structures 6 can be provided in the form of for example conical lenses or pyramids and can have varying sizes and light extracting properties in order to create different light distributions, e.g. general light and wall illumination at the same time from the same lighting fixture. A reflective shielding 5 is arranged at the light entrance surface of the light guide plate 4 at positions were the flux of the direct light of the light sources towards the light guide plate 4 have their maximum density in a powered state of the light sources. The reflective shielding 5 may for example include a metalized layer, a binding agent with reflecting particles, a dielectric multi stack layer or a reflective polymer film. Since the light guide plate 4 is shielded at positions where the flux of the light sources have their maximum density, the reflective shielding 5 will also ensure an efficient glare protection. The light L1, L2 generated by the light sources can be divided into three different parts, wherein one part L11, L21 is transmitted and redirected by the optical structure 6, a second part L12, L22 is reflected back towards the light source and the third part L13, L23 is in-coupled into the light guide plate 4 where it can travel through the light guide plate 4 and mix with light from other light sources and eventually exit the light guide plate 4 through any of the optical structures 6 provided over the light exit surface of the light guide plate. The light L12, L22 which is reflected back towards the light sources 2 will be redirected again towards the light guide plate 4 by the substrate 3. This provides for an effective mixing of light from different light sources 2 even before it has been in-coupled into the light guide plate. In combination with the mixing that takes place within the light guide plate 4, binning problems, due to the fact that the light sources 2 may have different brightness and colors, can be effectively decreased. Also, thanks to the fact that the light sources 2 are hidden behind reflective shielding 5 a LED failure will hardly be visible and will not appear as one optical structure becoming substantially darker than the other. Instead, a failure of a separate LED in a device according to the invention will appear as a minor reduction in light intensity from all optical structures 6 or at least from a number of optical structures within an area. It should be noted that the reflective shielding 5 does not necessarily have to be arranged on the light guide plate 4 itself. As long as it is positioned were the flux of the direct light of the light sources towards the light guide plate 4 have their maximum density in a powered state of the light sources it can be arranged anywhere between the light sources 2 and the light exit surface of the light guide plate 4.

Figure 2:
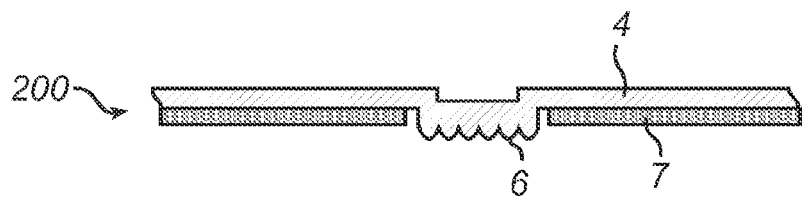
FIGS. 2-4 show different embodiments of light guide plates according to the invention.
Figure 3:
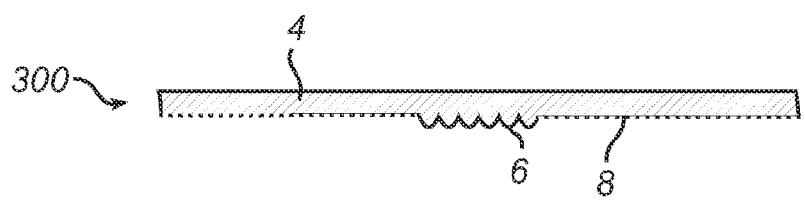
Figure 4:
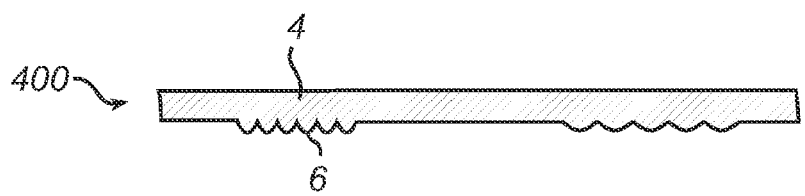

Referring to FIGS. 2-4, different embodiments of the light guide plate 4 are shown. In FIG. 2, an embodiment 200 is shown where the optical structure 6 is provided at lower position than the rest of the light exit surface of the light guide plate 4. By providing the reflective shielding 7 on the light exit surface of the light guide plate 4 instead of at the light entrance surface it can be ensured that the light will exit the light guide plate 4 only at the optical structure 6 and at the same time the total thickness of the light guide plate 4 can be kept constant.

FIG. 3 shows an embodiment 300 of the light guide plate 4 where a controlled roughness 8 has been introduced into the flat part of the light exit surface of the light guide plate 4. This roughness 8 serves as a secondary light extraction surface and can be shaped as a logotype, a company name or any other desired shape. This secondary light extraction surface will generally not provide a luminance as intense as the optical structure 6, but will give more of a glowing appearance. It is also possible to vary the roughness 8 over the surface in order to create different patterns. Together with the possibility of using different types of optical structures 6 this provides for a very high degree of design freedom. It is also possible to provide such a controlled roughness over the whole non-structured surface of the light guide plate 4 and if it is desirable to extract light in the opposite direction, a surface roughness may also be provided on the light entrance side of the light guide plate 4.

FIG. 4 shows two different optical structures 6 which will create different light distributions. These are merely two examples from a very broad range of possible structures and the figure is intended to show the principle of having different types of optical structures at different locations of the light exit surface of the light guide plate.

Figure 5:
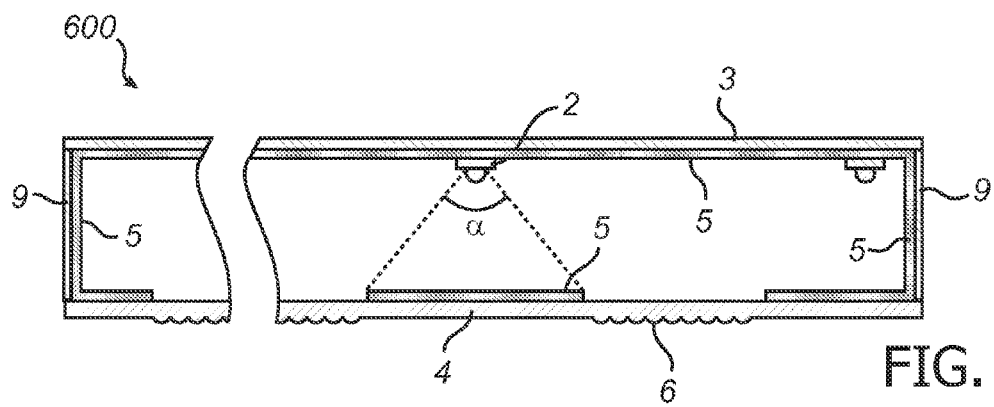
FIG. 5 shows a diagrammatical cross-sectional side view of an embodiment of a lighting device according to the invention.

FIG. 5 shows a light emitting device 600 in accordance with an embodiment of the present invention. In this embodiment reflective shielding 5 is provided on the light entrance surface of the light guide plate 4 at positions where the flux of the direct light of the LEDs towards the light guide plate 4 have their maximum density in a powered state of the LEDs. The provision of a reflective shielding to re-direct the light at this position is an effective measure to avoid glare problems. When using today's high power LEDs as light source, it has been found sufficient to provide reflective shielding 5 over an area such that the reflective shielding 5 together with the LED 2 form a cone having a cone angle α of at least 60° in order to provide adequate glare protection. Of course, the reflective shielding can be adapted to form any suitable cone angle. If different types of LEDs 2 are used in one and the same light emitting device 600, the reflective shielding 5 is individually adapted to each LED 2. For larger angle of incidence, the translucent material of the light guide plate 4 will decrease the observed luminance and provide sufficient glare protection. The combination of a shield just below the LED with the progressive de-glaring qualities of the translucent material for laterally emitted intensities provides a very effective de-glaring concept. Again, it should be noted that the reflective shielding 5 does not necessarily have to be arranged directly to the light guide plate 4. As long as it is positioned were the flux of the direct light of the LEDs towards the light guide plate 4 have their maximum density in a powered state of the LEDs and the required cone angles are respected, it can be arranged anywhere between the light source 2 and the light exit surface of the light guide plate 4. However, due to efficiency reasons, a position very close to the light source should be avoided. Another possibility, not shown in the figure, is to provide out-coupling of light from parts of the substrate 3. Often, an indirect component is desirable, to create e.g. a ceiling brightness or similar. This can be achieved by providing light emitting islands of light guiding material in the substrate 3. Similarly to light guide plate 4 described earlier, the out-coupling of light from the light guiding material can be achieved either with optical structures or by introducing a roughness into a surface of the light guiding material.

Further, side walls 9 are provided along the outer edges of the light guide plate 4 and the substrate 3 connecting them to each other. The inner surfaces of the side walls 9 as well as the lower surface of the substrate 3 are also provided with reflective shielding 5. Again, the reflective shielding 5 can include e.g. a metalized layer, a binding agent with reflecting particles or a reflective polymer film. The reflective shielding may, however, may also be obtained by choosing suitable materials for the substrate 3 and the inner walls 9. Examples of suitable materials include metals which, if necessary, have the surface in question treated to obtain good reflective properties.

The provision of reflective shielding 5 on all surfaces facing the interior of the light emitting device except for the in-coupling areas on the light entrance surface of the light guide plate 4 which are positioned outside the areas defined by the critical cone angles ensures a very effective mixing of the light emitted by the individual LEDs 2 even before the light is in-coupled into the light guide plate 4 where further mixing takes place which makes the light emitting device rather insensitive to binning problems that arise due to the fact that in general LEDs are different in respect of color and brightness. With prior art solutions, as shown in for example US 2005/0265029, each optical structure is positioned in front of a LED and most of the light emitted by the LED will be transmitted directly to the outside world. The light emitted by the separate optical structures in that prior art will therefore be perceived by an observer as having different colors and intensities.

A light emitting device may form one luminaire.

Still referring to FIG. 5, another possibility with the light emitting device according to the present inventive concept will now be discussed. A plurality of light emitting devices 600 can be placed against each other to form one luminaire consisting of a plurality of separate light emitting devices 600. If necessary, e.g. of energy consumption reasons or simply while less light is desirable, one or more of the separate light emitting devices can be switched off. Since the side walls 9 are arranged on top of the light guide plate 4 to leave the lateral surfaces of the light guide plate 4 exposed and due to the light guiding effect, the light emitting areas of the switched off devices will not turn black but still emit a glow of light. If, however, a single light emitting device 600 is intended to be used, the side walls 9 could be arranged to cover the lateral surfaces of the light guide plate 4.

FIGS. 6a-6f are merely intended to present a few of the many exit window patterns allowed by this optical concept. The grey areas are light emitting areas formed by optical structures 6.

Figure 6A:
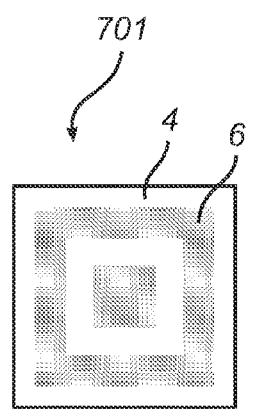
FIGS. 6a-6f show examples of different patterns of the optical structure allowed by this optical concept.

FIG. 6a shows an exit window pattern comprising a square-shaped optical structure enclosed in another optical structure 6 having the shape of a hollow quadrangle.

Figure 6B:
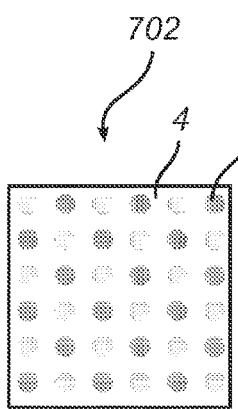

FIG. 6b shows an exit window pattern comprising a plurality of circular optical structures 6 evenly distributed over the surface of the light guide plate 4.

Figure 6C:
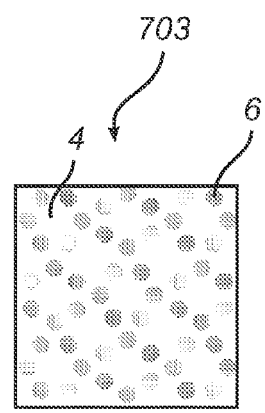

FIG. 6c shows an exit window pattern comprising a plurality of circular optical structures 6 arranged in groups of six, wherein each group depicts a more or less circular pattern.

Figure 6D:
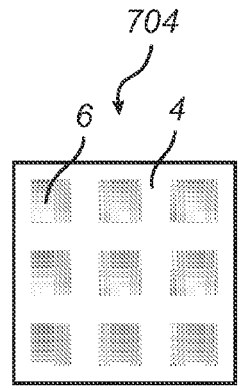

FIG. 6d shows an exit window pattern comprising a plurality square-shaped optical structures 6 evenly distributed over the surface of the light guide plate 4.

Figure 6E:
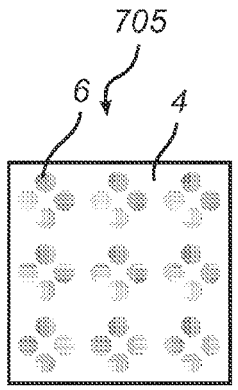

FIG. 6e shows an exit window pattern comprising a plurality of circular optical structures 6 arranged in groups of four, wherein each group depicts a tilted square.

Figure 6F:
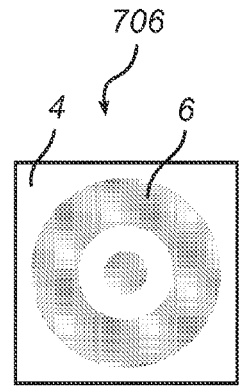

FIG. 6f shows an exit window pattern comprising a circular optical structure enclosed in another optical structure 6 shaped as a hollow circle.

Accordingly, using a light emitting device according to the invention, one housing can be equipped with more or less LEDs for different applications. And since the LED technology development constantly increases flux per LED values, it is necessary to be able to continuously adapt the system. Also, the positioning of the LEDs in a light emitting device according to this invention is more or less irrelevant, especially with respect to the optical structures, as long as the cone angles are respected, which allows for a simple and robust architecture with low tolerance requirements.

The person skilled in the art realizes that the present invention by no means is limited to the preferred embodiments described above. On the contrary, many modifications and variations are possible within the scope of the appended claims. For example, the light guide plate does not have to be flat but can instead have a curved form. Further, instead of using LEDs as light sources, it would also be possible to use OLED strips as light source.

The invention claimed is:

1. Light emitting device comprising a plurality of light sources mounted on a substrate, a light guide plate substantially parallel to the substrate, and side walls provided along outer edges of the light guide plate and along outer edges of the substrate connecting the outer edges of the light guide plate to the outer edges of the substrate so as to form a cavity bounded by the substrate, light guide plate and side walls, wherein said light guide plate has a light exit surface and an opposed light entrance surface facing said plurality of light sources, wherein said light entrance surface is arranged for in-coupling of light emitted by the light sources into the light guide plate, wherein at least part of the in-coupled light is transmitted within the light guide plate by total internal reflection so that light from different light sources is mixed within the light guide plate and wherein at least part of said light exit surface is provided with an optical structure for out-coupling of light and wherein the light emitting device further comprises reflective shielding provided at positions where the flux of the direct light of the light sources towards the light guide plate have their maximum density in a powered state of the light sources.

2. Light emitting device according to claim 1, wherein the reflective shielding is provided at the light entrance surface of the light guide plate at positions where the flux of the direct light of the light sources towards the light guide plate have their maximum density in a powered state of the light sources.

3. Light emitting device according to claim 1, wherein a surface of the substrate facing the light guide plate is provided with reflective shielding.

4. Light emitting device according to claim 1, wherein a plurality of optical structures are provided as separate exit windows over the light exit surface of the light guide plate and wherein at least a part of the non-structured area of the light exit surface of said light guide plate is flat.

5. Light emitting device according to claim 4, wherein a roughness is introduced into a part of the flat light exit surface of the light guide plate in order to provide secondary out-coupling of light.

6. Light emitting device according to claim 1, wherein inner surfaces of the side walls are provided with reflective shielding.

7. Light emitting device according to claim 6, wherein the side walls are arranged such that lateral surfaces of the light guide plate are exposed.

8. Light emitting device according to claim 1, wherein the light sources comprise light emitting diodes.

9. Light emitting device according to claim 1 wherein the optical structure comprises conical lenses.

10. Light emitting device according to claim 1 wherein the optical structure comprises elements having a pyramidal shape.

11. Light emitting device according to claim 1 wherein the optical structure comprises a diffusive element.

12. Light emitting device according to claim 1 wherein the optical structure comprises a refractive collimating structure.

13. Light emitting device according to claim 2 wherein reflective shielding is provided at the light guide plate such that at least 10% and not more than 90% of the area of the light exit surface of the light guide plate is shielded.

14. Luminaire, comprising a light emitting device according to claim 1.

* * * * *